United States Patent [19]

Shiban

[11] Patent Number: 5,353,829

[45] Date of Patent: Oct. 11, 1994

[54] APPARATUS FOR MIXING HAZARDOUS GAS WITH AN AIRFLOW

[76] Inventor: Samir S. Shiban, 1420 NW. 178th Pl., Beaverton, Oreg. 97006

[21] Appl. No.: 179,067

[22] Filed: Jan. 10, 1994

[51] Int. Cl.$^5$ .............................................. B01F 5/04
[52] U.S. Cl. ...................................... 137/88; 137/896
[58] Field of Search .................. 137/88, 896, 897, 898

[56] References Cited

U.S. PATENT DOCUMENTS

| | | | |
|---|---|---|---|
| 3,634,053 | 1/1972 | Klass | 137/88 X |
| 3,692,055 | 9/1972 | Benner | 137/896 |
| 4,078,576 | 3/1978 | Punch | 137/897 |
| 5,141,722 | 8/1992 | Nagashima | . |
| 5,178,841 | 1/1993 | Vokins et al. | . |

Primary Examiner—Robert G. Nilson
Attorney, Agent, or Firm—James D. Givnan, Jr.

[57] ABSTRACT

A housing receives ambient air through an inlet located so as to direct the airflow against blades of a rotor which disperses the airflow. A gas inlet conduit discharges hazardous gas into a chamber of the housing. The dispersed airflow acts on the hazardous gas entering the chamber to disperse and mix with the gas. The mixed air and hazardous gas flow impinges against a wall surface of the housing prior to discharge from the housing via an outlet conduit. A source such as the intake side of a blower induces the flow of air and hazardous gas through the housing and the outlet conduit. The rotor is located near an air inlet of the housing for rotor operation by airflow drawn into the housing. A flow sensor and damper control system are provided.

7 Claims, 1 Drawing Sheet

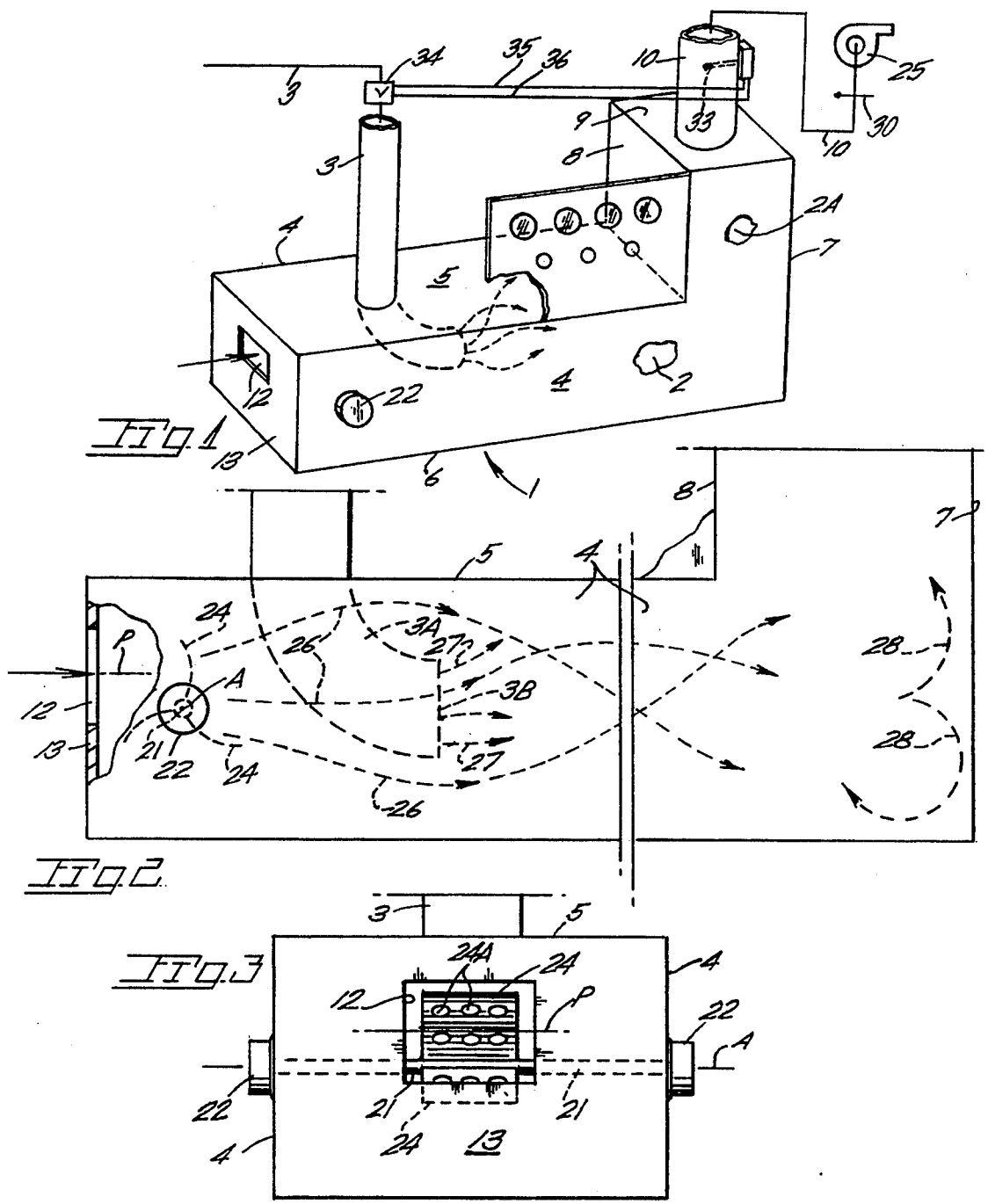

APPARATUS FOR MIXING HAZARDOUS GAS WITH AN AIRFLOW

BACKGROUND OF THE INVENTION

The present invention concerns the rendering of hazardous gases inert by dilution of same with an airflow.

The disposal of hazardous gases, which may include toxic, corrosive and explosive gases is of great concern in view of their dangerous nature and possible harm to the environment. Such gases result from various manufacturing processes including those utilizing chemical vapor deposition. Flammable gases also constitute a disposal problem.

A problem exists in the rendering of some explosive gases inert in view of their high volatility which precludes the use of electrical components in view of the risk of ignition. Further, the utilization of blowers, fans, filters in the treating of corrosive gases renders such components of costly manufacture and of limited life.

One process for reducing such gases to an inert state is that of combustion disposal. A degree of risk is still encountered in the conveying of hazardous gases from their source, such as a manufacturing process, to the combustion site. The formation of gas pockets during conveyance has been the cause of injury and death to workers as well as property damage from explosion. The conveyance of hazardous gases to a disposal apparatus or burner entails the construction of costly ducting not susceptible to the formation of pockets of gas or the escape of gas. Such ducting must be of non-corrosive materials to further add to the cost of same.

Governmental restrictions concerning the disposal of hazardous gases are being established and it is anticipated that a criteria for disposal will be on a parts per million (PPM) basis.

SUMMARY OF THE PRESENT INVENTION

The present invention concerns an apparatus for mixing a flow of hazardous gas with an airflow within a chamber subjected to below atmospheric pressure.

In a housing defined chamber, both the hazardous gas and an airflow are induced by a remote source of negative pressure such as the blower of a scrubber unit. A rotor in the housing chamber is disposed so as to be in the path of an incoming airflow and serves to disrupt the airflow into multiple and diverse currents which act on and mix with the hazardous gas delivered into the chamber by an inlet conduit. A discharge end of the conduit is disposed downstream from a housing air inlet resulting in the induced flow of air currents continuously moving past the discharge end of the conduit along diverse and changing paths.

The mixture of incoming air and hazardous gas continues along a housing in a turbulent manner with at least a portion of the mixture impinging against a wall of the housing as drawn by a negative pressure in an outlet duct. The below atmospheric pressure in the inlet conduit, housing and outlet duct avoids the risk of hazardous gas escaping from the present apparatus.

Important objectives of the present apparatus include the provision of a housing defining a chamber into which air is drawn and mixed in the chamber, with hazardous gas also drawn into the chamber by a source of below atmospheric pressure; the provision of the housing including a rotor powered by an airflow drawn into the housing with rotor blades imparting diverse currents to the flow which disperse and mix with hazardous gas prior to entry into an outlet duct; the provision of an apparatus for treating hazardous gases which relies on a flow of air induced into the housing by a remote source to avoid the risk which otherwise would be present if electrically energized components were utilized.

BRIEF DESCRIPTION OF THE DRAWINGS

In the accompanying drawings:

FIG. 1 is a perspective view of the present apparatus;
FIG. 2 is a side elevational view of the apparatus; and
FIG. 3 is an end elevational view of the left hand end of FIG. 2.

DESCRIPTION OF THE PREFERRED EMBODIMENTS

With continuing attention to the drawings, wherein applied reference numerals indicate parts similarly hereinafter identified, the reference numeral 1 indicates generally a housing defining a chamber 2 receiving a flow of hazardous gas via an inlet conduit 3.

The housing 1 comprises a pair of sidewalls at 4, a top wall 5 and a bottom wall 6. An upright end portion 2A of the chamber is defined by the housing sidewalls 4, an end wall 7, an intermediate wall 8 and a second top wall 9. An outlet duct is at 10. Housing 1 is preferably of stainless steel construction to handle a range of hazardous gases entering via inlet conduit 3.

Ambient air inlet means at 12 is located in an end wall 13 of the housing to receive air for subsequent mixing with the hazardous gas entering via inlet conduit 3. Conduit 3 extends internally of the housing and is provided with a curved end portion 3A terminating internally of the housing in an outlet end 3B.

In housing 1 is a rotor assembly including a shaft 21 journalled in bearings in sidewall mounted collars 22. Said shaft carries multiple blades as at 24 each shaped so as to move in response to incoming air entering via housing ambient air inlet 12. Blade apertures 24A contribute to dispensing the air.

Air inlet 12 is located so as to direct air drawn into housing toward a blade 24 on shaft 21 to drive the rotor assembly and more specifically impart turbulence to the incoming flow of ambient air which is induced into chamber 2 by a fan or scrubber at 25. Preferably the blades 24 are backward curved relative their direction of rotation about an axis A. Such blade imparted turbulance is shown by dashed arrows at 26. The turbulent air flows past outlet 3B of hazardous gas inlet 3 results in the hazardous gas being dispersed per the dashed arrows at 27 as it mixes with turbulent air 26. Such mixing continues as the mixture moves along chamber 2. Further mixing occurs at 28 when the mixed gas flow encounters wall 7 of the housing. The flow is drawn upwardly toward outlet duct 10 in communication with a reduced pressure source area such as the inlet of a fan or scrubber unit 25.

A damper 30 in duct 10 is preferably of the locking type and regulates mixed gas flow through housing 1 and duct 10. Air flow through outlet duct 10 is monitored by a flow sensor unit 33 in circuit with an inlet valve 34 to terminate hazardous gas flow in inlet 3 upon detection of a reduced mixed flow in outlet duct 10. The ratio of airflow through outlet duct 10 to the flow in inlet 3 should be within 100 CFM to 250 CFM to 1 CFM and may vary to best treat the hazardous gas being processed. Additional sensors and control elements, if so desired, will be readily apparent to those skilled in the art. A valve control circuit includes leads 35-36 from sensor unit 33.

Inlet means 12 has a medial plane P which is offset from rotor shaft axis A to ensure inlet air impinging against rotor blades 24 in a successive manner. The blades, preferably apertured, disperse the airflow into diverse currents which act on the hazardous gas flow discharged from conduit end 3B and mix with same to the extent noted above to render same inert.

The following gases are some of the hazardous gases that may be treated with the present apparatus:

| |
|---|
| Hydrogen (flamamble) |
| Monosilane (flamamble) |
| Butene (flamamble) |
| Phosphene (toxic) |
| Germane (toxic) |
| Chlorine (toxic) |
| Dichlorosilane (corrosive) |
| Chlorine trifluoride (corrosive) |
| Hydrogen chloride (corrosive) |

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

1. An apparatus for mixing hazardous gas with air to render the gas inert, said apparatus comprising, a housing defining a chamber, air inlet means admitting an airflow into said chamber, a rotor assembly including blades in said chamber, each of said blades having a rotational path into the airflow to disperse the airflow, a hazardous gas inlet conduit having an outlet in said chamber and in the dispersed airflow, an outlet conduit in communication with said chamber, and means inducing a flow of mixed air and hazardous gas through said outlet conduit.

2. The apparatus claimed in claim 1 wherein said housing includes an elongate portion within which said rotor and said outlet are disposed, said housing additionally includes a wall surface disposed transversely to the axis of said elongate housing portion against which the mixed hazardous gas and airflow impinges.

3. The apparatus claimed in claim 1 wherein said blades are apertured.

4. The apparatus claimed in claim 3 wherein said blades are of curved linear shape in cross section.

5. The apparatus claimed in claim 1 wherein said housing includes a wall, said air inlet means embodied in an open area in the wall, a medial plane of said open area being offset from the axis of rotor rotation.

6. The apparatus claimed in claim 1 additionally including a flow sensor unit in said outlet conduit, adjustable damper means in said inlet conduit responsive to signals from said flow sensor unit.

7. The apparatus claimed in claim 1 wherein said means is the intake side of a blower served by said outlet conduit.

* * * * *